US012308003B2

(12) United States Patent
Fan et al.

(10) Patent No.: US 12,308,003 B2
(45) Date of Patent: May 20, 2025

(54) SPRING KEYBOARD

(71) Applicants: Medeli Musical Instrument (Zhuhai) Co., Ltd., Zhuhai (CN); Medeli Electronics (Shanghai) Co., Ltd., Shanghai (CN)

(72) Inventors: Xiaoxian Fan, Zhuhai (CN); Dominic Chun hei Au, Zhuhai (CN); Guozong Liu, Zhuhai (CN); Peng Zhou, Zhuhai (CN)

(73) Assignees: Medeli Musical Instrument (Zhuhai) Co., Ltd., Zhuhai (CN); Medeli Electronics (Shanghai) Co., Ltd, Shanghai (CN)

( * ) Notice: Subject to any disclaimer, the term of this patent is extended or adjusted under 35 U.S.C. 154(b) by 198 days.

(21) Appl. No.: 18/017,082

(22) PCT Filed: Apr. 12, 2021

(86) PCT No.: PCT/CN2021/086440

§ 371 (c)(1),
(2) Date: Jan. 20, 2023

(87) PCT Pub. No.: WO2022/016913

PCT Pub. Date: Jan. 27, 2022

(65) Prior Publication Data

US 2023/0298544 A1 Sep. 21, 2023

(30) Foreign Application Priority Data

Jul. 24, 2020 (CN) ........................ 202021494698.4

(51) Int. Cl.
*G10C 3/12* (2006.01)

(52) U.S. Cl.
CPC .................................... *G10C 3/12* (2013.01)

(58) Field of Classification Search
CPC ...................................................... G10C 3/12
See application file for complete search history.

(56) References Cited

U.S. PATENT DOCUMENTS 2,675,728 A * 4/1954 Jewett ..................... G10C 3/12 84/424
3,165,965 A * 1/1965 Lo ........................... G10C 3/12 84/435

(Continued)

FOREIGN PATENT DOCUMENTS

CN 108648726 A * 10/2018
CN 114429762 A * 5/2022
WO WO-2016004449 A1 * 1/2016 ............... G10C 3/20

*Primary Examiner* — Robert W Horn
(74) *Attorney, Agent, or Firm* — IPRTOP LLC

(57) ABSTRACT

A spring keyboard is disclosed. The spring keyboard includes a key support (1) and multiple keys (2) disposed on the key support (1), A back end of a key (2) is connected with the key support (1) through a spring (3). The key support (1) includes a first rotary structure (41). The key (2) includes a second rotary structure (42) matched with the first rotary structure (41), and the key (2) can rotate up and down around the first rotary structure (41). The key support (1) further includes a limit seat (51), and the key (2) further includes a limit reverse buckle (52) matched with the limit seat (51). The limit reverse buckle (52) faces towards a front end of the one of the keys (2). The structure of the spring keyboard is reliable, effectively eliminating the hidden danger of disconnecting the key (2) from the key support (1).

5 Claims, 3 Drawing Sheets

(56) References Cited

U.S. PATENT DOCUMENTS

| | | | | | |
|---|---|---|---|---|---|
| 3,306,152 | A * | 2/1967 | Klann | G10B 3/12 | D17/9 |
| 3,570,359 | A * | 3/1971 | Ohno | G10H 1/344 | 84/439 |
| 3,616,722 | A * | 11/1971 | Hochleitner, Jr. | G10C 3/12 | 84/354 |
| 3,654,831 | A * | 4/1972 | Grilli | E05D 7/081 | 84/435 |
| 3,903,780 | A * | 9/1975 | Aliprandi | G10C 3/12 | 84/433 |
| 3,935,784 | A * | 2/1976 | Koepke | G10H 1/346 | 984/345 |
| 4,044,646 | A * | 8/1977 | Invernati | G10C 3/12 | 84/435 |
| 4,364,297 | A * | 12/1982 | Meier | G10C 3/12 | 984/61 |
| 4,474,100 | A * | 10/1984 | Kondo | G10C 3/12 | 984/61 |
| 4,476,769 | A * | 10/1984 | Kumano | G10H 1/346 | 984/61 |
| 4,512,234 | A * | 4/1985 | Kumano | G10C 3/12 | 84/439 |
| 4,604,937 | A * | 8/1986 | Kumano | G10C 3/12 | 984/61 |
| RE35,161 | E * | 2/1996 | Kumano | G10H 1/344 | 84/434 |
| 5,505,115 | A * | 4/1996 | Vandervoort | G10H 1/22 | 400/490 |
| 7,411,122 | B2 * | 8/2008 | Yamaguchi | G10H 1/346 | 84/430 |
| 9,269,336 | B2 * | 2/2016 | Osuga | G10C 3/12 | |
| 10,311,847 | B2 * | 6/2019 | Ichiki | G10H 1/346 | |
| 11,017,749 | B2 * | 5/2021 | Tsuzuku | G10C 3/12 | |
| 11,538,444 | B2 * | 12/2022 | Kasubuchi | G10H 1/346 | |
| 11,574,615 | B2 * | 2/2023 | Takata | G10H 1/346 | |
| 2013/0283998 | A1 | 10/2013 | Seisakusho | | |
| 2023/0298544 | A1 * | 9/2023 | Fan | G10H 1/34 | 84/423 R |

* cited by examiner

SPRING KEYBOARD

TECHNICAL FIELD

The present disclosure relates to the technical field of piano instrument, in particular, to a spring keyboard.

BACKGROUND

In traditional spring keyboards, a key is levered around a fulcrum of a key support. However, in the process of using the spring keyboard, the front end of the key will be under great pressure because the player sometimes presses too hard or wants to realize the after-touch function. If the key cannot bear such great pressure after reaching its maximum travel, the back end of the key will be warped, and the key cannot be reset, making it impossible to play continuously.

At present, the general solution is to provide a buckle on the key, the buckle faces toward the back end of the key, and a buckle seat is also provided on the key support. When the front end of the key is pressed down, the stroke of the key becomes larger, and the distance between the back end of the key and the buckle seat also increases gradually. When the key is pressed to the maximum, there is a large distance between the buckle and the buckle seat, if the pressure force is increased, then the back end of the key will be warped, and the original rotating fulcrum will be detached until the buckle fits tight with the buckle seat. However, the contact area between the buckle and buckle seat is very small. At this time, if the pressure force is increased, the buckle will easily slip, and the back end of the key will be warped, which cannot effectively prevent the problem of disconnecting the key from the key support.

SUMMARY

The present disclosure provides a spring keyboard. The spring keyboard includes a key support and a plurality of keys installed on the key support. A back end of one of the plurality of keys is connected with the key support through a spring, the key support includes a first rotary structure, and the one of the plurality of keys includes a second rotary structure matched with the first rotary structure, and the key is rotatable up and down around the first rotary structure, the key support further includes a limit seat, and the one of the plurality of keys includes a limit reverse buckle matched with the limit seat.

Further, the limit reverse buckle faces towards a front end of the one of the plurality of keys.

Further, the back end of the one of the plurality of keys includes a spring fixing hole, the limit reverse buckle is disposed at a front side of the spring fixing hole, and the second rotary structure is disposed at a front side of the limit reverse buckle.

Further, the limit reverse buckle includes a connecting part and a reverse buckle part, wherein a first end of the connecting part is connected with the one of the plurality of keys, and a second end of the connecting part is connected with the reverse buckle part, wherein the inverse buckle part includes a buckle facing toward the front end of the one of the plurality of keys.

Further, the buckle has a clearance fit with the limit seat, when the front end of the one of the plurality of keys is in a horizontal state, a gap exists between the buckle and the limit seat, when the front end of the one of the plurality of keys is pressed down, the gap between the buckle and the limit seat gradually decreases until the buckle abuts against the limiting seat.

Further, the limit seat is connected to a bottom of the first rotary structure, and an active groove for the limit seat is disposed at the first rotary structure.

Further, the second rotary structure includes an inclined baffle matched with the active groove.

Further, the plurality of keys includes a plurality of white keys and a plurality of black keys.

The present disclosure has the following beneficial effects:

The present disclosure provides a spring keyboard. The limit reverse buckle faces towards the front end of the key. When pressing the front end of the key, the key rotates around the first rotary structure in a vertical plane, the distance between the limit reverse buckle and the limit seat on the key support becomes smaller and smaller. After the key is rotated downward to the maximum stroke, the limit reverse buckle at the back end of the key and the limit seat on the key support are just in close contact. If the pressure force to the key is continued to be increased, the limit reverse buckle and the limit seat will be buckled tighter and tighter. The back end of the key will not be warped. The structure of the present disclosure is reliable, effectively eliminating the hidden danger of disconnecting the key from the key support.

BRIEF DESCRIPTION OF THE DRAWINGS

The appended drawings are used for further explanation of the present disclosure, but the embodiments in the appended drawings do not constitute any limitation of the present disclosure. Those skilled in the art may obtain other appended drawings according to the following drawings without creative labor.

DETAILED DESCRIPTION

Figure 1:
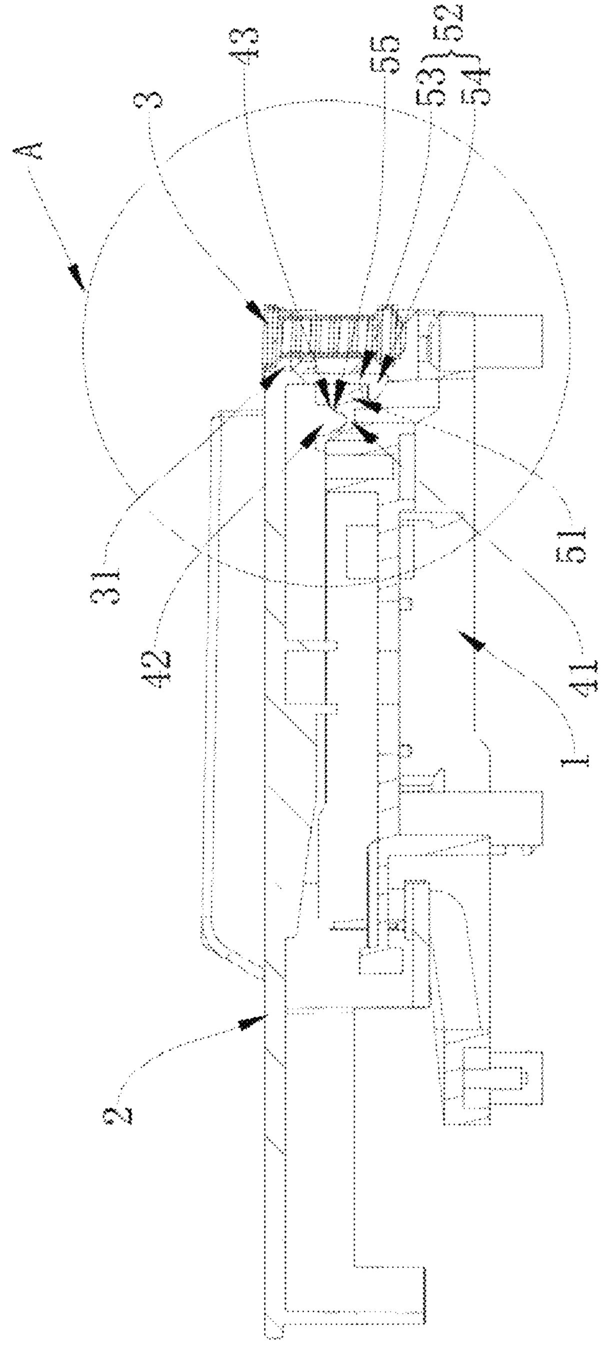
FIG. 1 shows a schematic diagram of the overall structure of a spring keyboard in a natural state according to the present disclosure.

The technical solutions in the present disclosure will be described clearly and completely below with reference to the drawings. The described embodiments are a part of the embodiments of the present disclosure, and will not be limited. Based on the embodiments in the present disclosure, all other embodiments obtained by a person skilled in the art fall within the protection scope of the present disclosure.

In the description of the present disclosure, it should be noted that the orientation or positional relationship indicated by the terms "center", "vertical", "horizontal", "upper", "lower", "left", "right", "inner", or "outer", etc. is based on the orientation or positional relationship shown in the drawings, and are only for the convenience of describing the present disclosure and simplifying the description, rather than indicating or implying that the referred device or element must have a specific orientation, be constructed and operated in a specific orientation, and therefore cannot be understood as a limitation of the present disclosure. The term "back end (side)" means the same as the "distal end (side)" and refers to the end (side) that is far away from the player, and the term "front end (side)" means the same as the "proximal end (side)" and refers to the end (side) that is close to the player. In addition, the terms "first", "second", and "third" are only used for descriptive purposes, and cannot be understood as indicating or implying relative importance.

Embodiment 1

Figure 2:
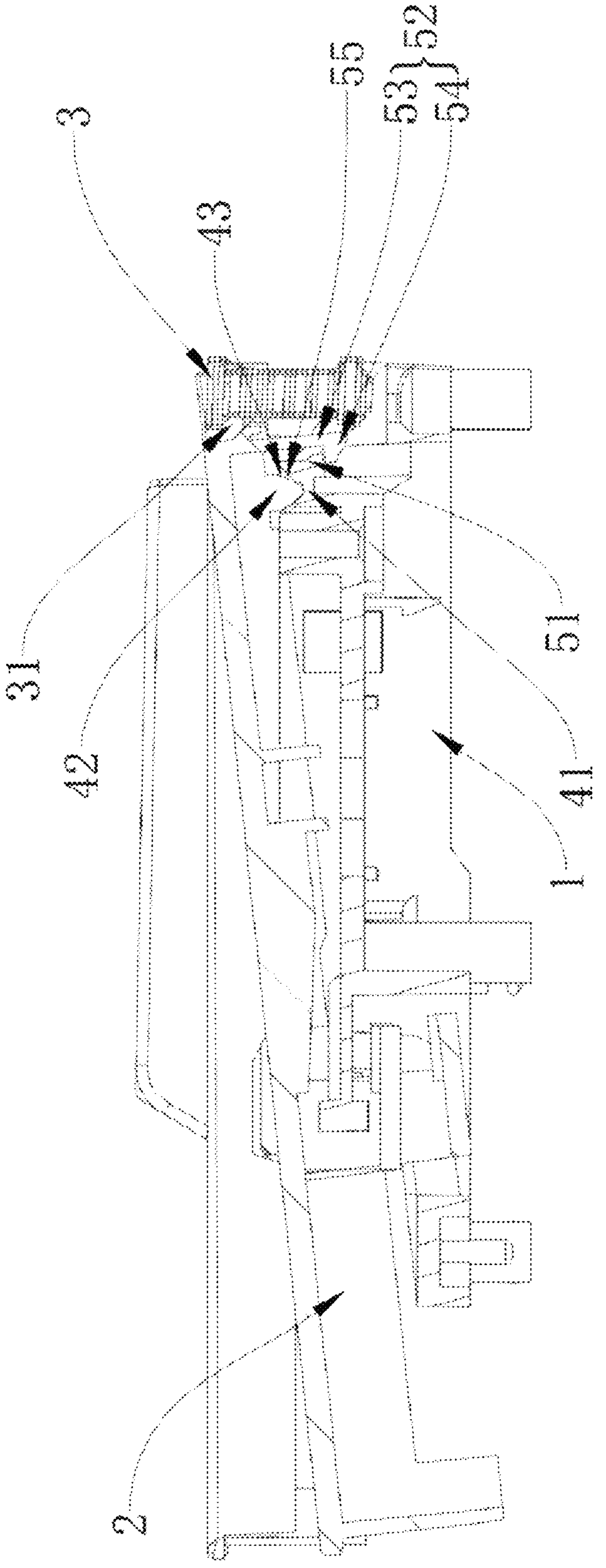
FIG. 2 shows a schematic diagram of the overall structure of a spring keyboard under the condition that the keys are still pressed after reaching the maximum stroke according to the present disclosure.
Figure 3:
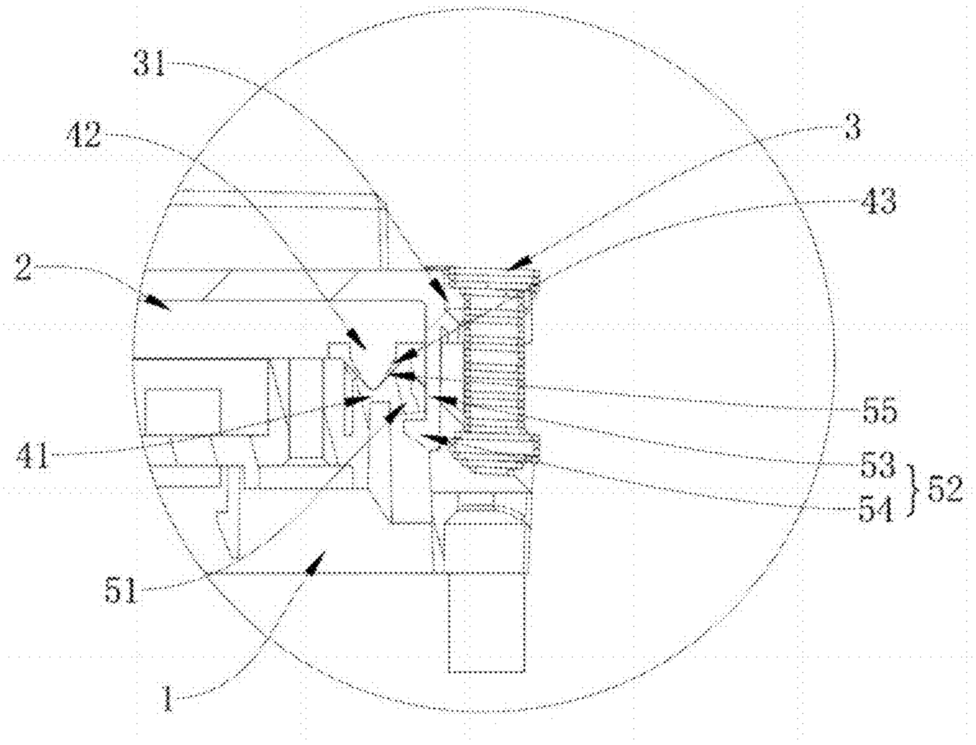
FIG. 3 is an enlarged diagram of part A in FIG. 1 of the spring keyboard according to the present disclosure.

Refer to FIGS. 1-3, the present disclosure provides a spring keyboard. The spring keyboard includes a key support 1 and multiple keys. The keys include multiple white keys and multiple black keys and are installed on the key support 1. A back end of a key 2 is connected with the key support 1 through a spring 3. The key support 1 includes a first rotary structure 41. The key 2 includes a second rotary structure 42 matched with the first rotary structure 41, and the key 2 can rotate up and down (i.e., rotate in a vertical plane) around the first rotary structure 41. The key support 1 further includes a limit seat 51, and the key 2 further includes a limit reverse buckle 52 matched with the limit seat 51. The limit reverse buckle 52 faces towards a front end of the key 2. The key support 1 further includes front and rear guide teeth which are used for limiting the left and right positions of the key 2 when the key 2 is rotated up and down.

It should be noted that, in order to realize the resetable lever movement of the key 2, the combination of the first rotary structure 41 and the second rotary structure 42 acts as the fulcrum. When pressing the front end of the key 2, the back end of the key 2 will be subjected to a tensile resetting force provided by the spring 3. When the press force at the front end of key 2 is withdrawn, the key 2 will reset immediately. As shown in FIG. 2, when the key 2 is pressed to its maximum stroke and continues to be pressed, the combination of the limit reverse buckle 52 and the limit seat 51 effectively prevents the key 2 from continuing to rotate downward significantly. In addition, the limit reverse buckle 52 faces towards the front end of the key 2. During the process of pressing the front end of the key 2, the limit reverse buckle 52 gradually moves upward in a vertical direction and gradually moves away from the front end of the key 2 in a horizontal direction, that is, it moves along a horizontal direction of the limit seat 51. With the increase of the stroke of the key 2, the distance between the limit reverse buckle 52 and the limit seat 51 becomes smaller and smaller, and the key 2 is fixed more firmly, effectively eliminating the hidden danger of disconnecting the key 2 from the key support 1.

Refer to FIG. 3, in this embodiment, the back end of the key 2 includes a spring fixing hole 31. The spring fixing hole 31 has a funnel shape, the top of the spring fixing hole 31 is large and the bottom of the spring fixing hole 31 is small. The first end of the spring 3 is fixed to the spring fixing hole 31, the shape of the first end of the spring 3 is consistent with that of the spring fixing hole 31, and the second end of the spring 3 is fixed to the key support 1. When pressing the front end of the key 2, the first end of the spring 3 is pulled. Since the spring fixing hole 31 has a funnel shape, the spring 3 is easier to be pulled up, and when the key 2 needs to be reset, the shrinkage force of the spring 3 in the spring fixing hole 31 is more effective.

As an example, the limit reverse buckle 52 is disposed on a front side of spring fixing hole 31, the second rotary structure 42 is disposed on a front side of the limit reverse buckle 52. The limit reverse buckle 52 includes a connecting part 53 and a reverse buckle part 54. The first end of the connecting part 53 is connected with the key 2, and the second end of the connecting part 53 is connected with the reverse buckle part 54. The reverse buckle part 54 includes a buckle facing toward the front end of the key 2.

The spring fixing hole 31, the limit reverse buckle 52 and the second rotary structure 42 are successively arranged from the back end to the front end of the key 2, correspondingly, a part connecting the spring 3, the limit seat 51 and the first rotary structure 41 are successively arranged from the back end to the front end of the key support 1.

In the present embodiment, the buckle has a clearance fit with the limit seat 51. When the front end of the key 2 is in a horizontal state, there is a gap between the buckle and the limit seat 51, such that there is a certain buffer area. When the front end of the key 2 is pressed, the gap between the buckle and the limit seat 51 gradually decreases. When the key 2 reaches its maximum stroke, the buckle abuts against the limit seat 51, which increases the contact area between the buckle and the limit seat 51 and effectively prevents the key 2 from leaving the key support.

In addition, the limit seat 51 is connected to the bottom of the first rotary structure 41, such that the limit seat 51 is integrated with the first rotary structure 41. An active groove 55 for the limit seat 51 is disposed at the first rotary structure 41 and is inclined towards the bottom of the first rotating structure 41. When the limit seat 51 is deformed upward due to the buckle, the limit seat 51 can rotate slightly towards the direction of the active groove 55, and there is a certain activity space for the limit seat 51 in the active groove 55. Further, the second rotary structure 42 includes an inclined baffle 43 which is matched with the active groove 55. When the limit seat 51 deforms upward to a certain extent, the inclined baffle 43 will limit the limit seat 51 to prevent the limit seat 51 from excessive deformation and causing irreversible damage to the material.

In summary, the present disclosure provides a spring keyboard. The spring keyboard includes a key support 1 and multiple keys 2 disposed on the key support 1. A back end of a key 2 is connected with the key support 1 through a spring 3. The key support 1 includes a first rotary structure 41. The key 2 includes a second rotary structure 42 matched with the first rotary structure 41, and the key 2 can rotate up and down around the first rotary structure 41. The key support 1 further includes a limit seat 51, and the key 2 further includes a limit reverse buckle 52 matched with the limit seat 51. The limit reverse buckle 52 faces towards a front end of the key 2. In the present disclosure, when pressing the front end of the key 2, the key 2 rotates up and down around the first rotary structure 41, the limit reverse buckle 52 and the limit seat 51 on the key support 1 are buckled tighter and tighter as the key 2 continues to rotate downward. When the key continues to be pressed down after the maximum stroke is reached, such as in a case when the after-touch function is required, the back end of the key 2 will not be warped. The structure is simple and reliable, effectively eliminating the hidden danger of disconnecting the key 2 from the key support 1.

It should be noted that the present disclosure is not limited to the above embodiments, which are preferred embodiments of the present disclosure and are not intended to limit the present disclosure. Any modification, equivalent replacement, improvement, etc. made to the present disclosure within the principle of the present disclosure should be included in the protection scope of the present disclosure.

What is claimed is:

1. A spring keyboard, comprising: a key support and a plurality of keys installed on the key support, wherein a back end of one of the plurality of keys is connected with the key support through a spring, wherein the key support includes a first rotary structure, and the one of the plurality of keys includes a second rotary structure matched with the first rotary structure and is rotatable up and down around the first rotary structure, wherein the key support further comprises a limit seat, and the one of the plurality of keys includes a limit reverse buckle matched with the limit seat;

wherein the limit reverse buckle comprises a connecting part and a reverse buckle part, wherein a first end of the connecting part is connected with the one of the plurality of keys, and a second end of the connecting part is connected with the reverse buckle part, wherein the reverse buckle part comprises a buckle facing toward the front end of the one of the plurality of keys;

wherein the buckle has a clearance fit with the limit seat, wherein when the front end of the one of the plurality of keys is in a horizontal state, a gap exists between the buckle and the limit seat, wherein when the front end of the one of the plurality of keys is pressed down, the gap between the buckle and the limit seat gradually decreases until the buckle abuts against the limiting seat.

2. The spring keyboard as in claim 1, wherein the back end of the one of the plurality of keys includes a spring fixing hole, wherein the limit reverse buckle is disposed at a front side of the spring fixing hole, and the second rotary structure is disposed at a front side of the limit reverse buckle.

3. The spring keyboard as in claim 1, wherein the limit seat is connected to a bottom of the first rotary structure, and an active groove for the limit seat is disposed at the first rotary structure.

4. The spring keyboard as in claim 3, wherein the second rotary structure comprises an inclined baffle matched with the active groove.

5. The spring keyboard as in claim 1, wherein the plurality of keys comprises a plurality of white keys and a plurality of black keys.

* * * * *